United States Patent [19]

Welschof et al.

[11] Patent Number: 4,460,058
[45] Date of Patent: Jul. 17, 1984

[54] BEARING ASSEMBLY FOR A WHEEL HUB DRIVEN BY A ROTARY CONSTANT VELOCITY UNIVERSAL JOINT

[75] Inventors: Hans-Heinrich Welschof, Rodenbach; Rudolf Beier, Offenbach am Main, both of Fed. Rep. of Germany

[73] Assignee: Löhr & Bromkamp GmbH, Offenbach am Main, Fed. Rep. of Germany

[21] Appl. No.: 371,004

[22] Filed: Apr. 22, 1982

[30] Foreign Application Priority Data

Apr. 28, 1981 [DE] Fed. Rep. of Germany ....... 3116720

[51] Int. Cl.³ .............................................. B60K 17/22
[52] U.S. Cl. ...................................... 180/258; 403/97
[58] Field of Search ....................... 180/254, 258, 259; 403/96, 97, 296, 298, 337

[56] References Cited

U.S. PATENT DOCUMENTS 4,053,248 10/1977 Schultenkamper et al. .......... 403/97
4,352,528 10/1982 Guimbretiere ...................... 180/258

FOREIGN PATENT DOCUMENTS 1931300 10/1975 Fed. Rep. of Germany .
2848169  5/1979 Fed. Rep. of Germany ...... 180/254

Primary Examiner—David M. Mitchell
Assistant Examiner—Donn McGiehan
Attorney, Agent, or Firm—Toren, McGeady and Stanger

[57] ABSTRACT

A wheel bearing assembly driven by a universal joint is arranged to consist of two individual finish-assembled units having its components joined together so as to be easily disconnected and removable. The universal joint is formed with an outer joint member having an end face which is arranged with gear teeth engaging complementary gear teeth formed on the inner bearing ring of the wheel bearing assembly for torque transmission purposes whereby a construction having a shorter axial length may be achieved.

4 Claims, 8 Drawing Figures

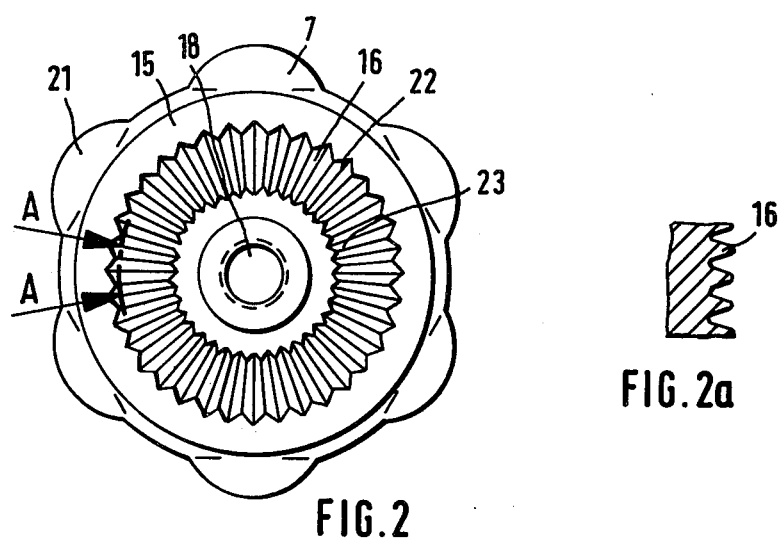
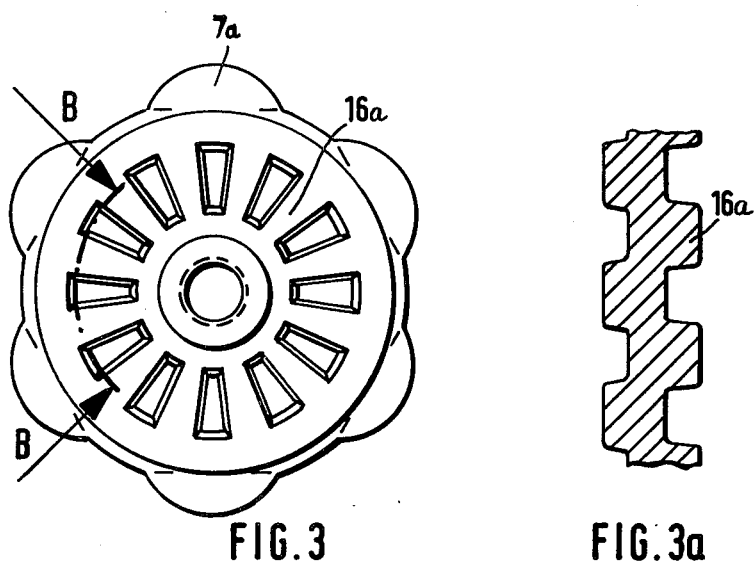

BEARING ASSEMBLY FOR A WHEEL HUB DRIVEN BY A ROTARY CONSTANT VELOCITY UNIVERSAL JOINT

The present invention relates generally to wheel assemblies for automotive vehicles and more particularly to a wheel bearing assembly wherein the hub of a wheel is driven by means of a rotary CV universal joint and is arranged at an associated wheel carrier of a motor vehicle.

In wheel assemblies of the type to which the present invention relates, the wheel bearing is held by the wheel carrier and the wheel hub and/or the inner bearing rings of the wheel bearing assembly are joined together in fixed rotative engagement with the outer joint member of the rotary CV universal joint by means of end gear teeth. The inner bearing ring or the wheel hub of the wheel assembly and the outer joint member are tensioned by means of a centrally located bolt.

Joints of the type of which the present invention relates known in the prior art, for example, from German Pat. No. 19 31 300, are provided with a wheel bearing wherein the joint is capable of transmitting torque to the inner bearing rings by means of end teeth and from the inner bearing rings by means of further end teeth which achieve driving engagement with the wheel hub. However, in such a device it is rather difficult to ensure concentric operation of the individual components relative to each other. Additionally, wheel contact forces, lateral forces and bending moments of the wheel must be accommodated in such a structure. Furthermore, such an arrangement requires a large number of components in order not only to permit the torque to be adequately transmitted but also to effect accurate design of the actual bearing.

Further disadvantages of such prior art devices arise in that, if the bolted connection is unfastened or if damage or rupture occurs, the wheel and wheel hub must be removed from the vehicle. In addition, because of the high tensioning forces required for affixing the bearing in the assembly, only universal joints having large cross-sectional configurations can be used. The tightening torques which must be applied tend to be so high that they either cannot be applied or can only be applied with great difficulty at normal servicing stations.

The present invention is thereby directed toward provision of a bearing assembly of the type described, wherein radial offset between the bearing and the universal joint components need not have any effect on the functioning of the universal joint and/or of the wheel bearing, thereby ensuring easy, but nevertheless secure, fixing of the assembly, with the bearing assembly having a relatively shorter axial length and with the connection remaining essentially unaffected by forces resulting from torque. With the present invention, the outer joint member may be produced from plate material, if desired.

SUMMARY OF THE INVENTION

Briefly, the present invention may be described as an improvement in an assembly for the hub of a wheel of a motor vehicle including wheel bearing means having an inner and an outer wheel bearing ring, said inner wheel bearing ring being in driving connection with said wheel hub, universal joint means for driving said wheel hub through said inner bearing ring, said universal joint means including an inner joint member and an outer joint member with said outer joint member being in driving connection with said inner bearing ring, and centrally located bolt means connected between said wheel hub and said outer joint member, the improvement comprising that the wheel bearing means and the universal joint means are constructed as two separate units, that the outer joint member and the inner bearing ring are rotatably joined in driving connection with each other by gear teeth which are formed with a flank angle which deviates from 90° in the circumferential and in the axial direction, and the gear teeth are in clearance-free engagement with each other with the flank angles thereof being such that the gear teeth are in self-locking engagement.

Thus, in accordance with the present invention, the objectives thereof are achieved in that the bearing assembly and the universal joint are formed as two separate units with the end teeth having a flank angle which deviates from 90° both in the circumferential and in the axial direction. The gear teeth are in engagement with each other free of clearance and the flank angle is such that the teeth are self-locking.

The advantages of such a design with end teeth is that it will not result in large dimensions taken in the axial direction such as will be caused when a different type of interconnecting structure is provided. Additionally, the end teeth can be produced directly on the outer joint member simultaneously therewith in a manner that does not require metal cutting, i.e., in a non-chip forming way. Such a production method could involve, for example, a pressing, punching, coining or cold extruding operation. Parallel teeth can also be produced easily by broaching or milling.

A further advantage of the structure arranged in accordance with the present invention is that the gear teeth need not be used merely for torque transmitting purposes and thus, the fixing bolt will provide only a holding function. There is no need to accommodate excessive axial forces and such axial forces are required only for fixing the bearing rings of a conventional bearing. Similarly, there arises no need to adjust the bearing play.

A lightweight design may be achieved by means of the present invention if the axial forces which may result from transmission of torque by the gear teeth are mantained to be no greater than the forces resulting from the bending moment of the articulated universal joint.

The use of joints having cold formed ball grooves or tracks produced in a coining operation will be particularly advantageous. Such an advantage consists in the utilization of plate metal as a starting or blank material which may then be cold formed.

In accordance with a further characteristic of the invention, the end face of the outer joint member may be formed with a curvature so that when assembly of the device occurs, the gear teeth will first engage on the diametrically outermost parts thereof and subsequently be brought into engagement over the entire area of the gear teeth. The thin plate metal part of the outer member is plate-shaped and only when the central bolt is tightened, do the faces achieve proper contact.

The curvature of the end face of the plate-like outer joint member permits tensioning so that formation of the parts with large tolerances which will ensure adequate fixing engagement may be achieved without requiring metal cutting production techniques, i.e., by non-chip forming operations.

In order to be brought into self-locking condition in accordance with the design or sliding conditions of the gear teeth, provision is furthermore made for the flank angle of the gears to be smaller than 20°.

In order to permit assembly or removal of the drive shaft from the exterior of the vehicle, a further important feature of the invention provides that the outer joint member be formed in its end face with a nose which has a threaded central bore into which the center bolt which extends through the center bore of the inner bearing ring may be fitted. The advantage of such a construction is that the central fixing bolt can be reached and detached through the center bore of the vehicle wheel. Shortening of the drive shaft by normal sliding of the axially movable universal joint on the side of the transmission may be utilized in order to fit or remove the drive shaft without requiring removal or unfastening of other parts of the assembly. The outer joint member will be centered by means of the radial end teeth and any central offset which might occur will be compensated by the rotary universal joint itself. Therefore, in order to achieve centering of the parts, only rough tolerances are required.

In order to avoid further centering measures, a further characteristic of the invention provides for the journal to ensure centering of the joint with the teeth extending parallel relative to each other.

A further characteristic of the invention provides for the teeth to be designed as self-centering gear teeth, with the centering journal being no longer required inasmuch as the correspondingly designed teeth will undertake the centering function.

The central bore of the wheel hub is well suited for receiving the fixing bolt and thus, accessibility from the exterior of the vehicle will always be ensured.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is an end view of the outer joint member of the joint assembly shown in FIG. 1;

FIG. 2a is a sectional view taken along the line A—A of FIG. 2;

FIG. 3 is an end view of the outer joint member of another embodiment of the invention;

FIG. 3a is a sectional view taken along the line B—B of FIG. 3;

DETAILED DESCRIPTION OF THE PREFERRED EMBODIMENTS

Figure 1:
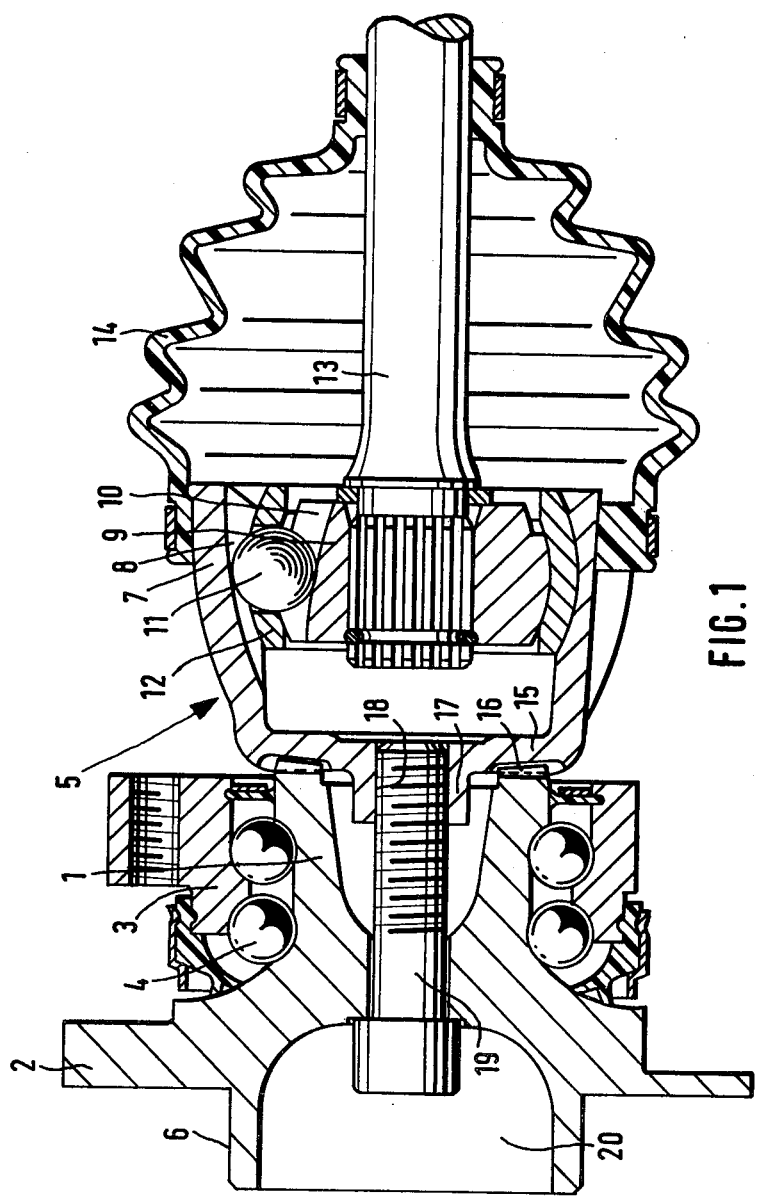
FIG. 1 is a sectional view of an assembly including the wheel bearing and a driving universal joint axially fixed therewith.

Referring now to the drawings, and particularly to FIG. 1, there is shown an assembly in accordance with the present invention which essentially includes a wheel bearing assembly shown to the left in FIG. 1 and including an inner bearing ring 1 and an outer bearing ring 2 and a universal joint assembly 5 shown to the right in FIG. 1.

The inner bearing ring 1 of the wheel bearing assembly is formed integrally with a wheel hub 2 of the wheel (not shown) of the vehicle upon which the assembly of the present invention is mounted.

The wheel bearing assembly includes roller bearing engaging tracks which are formed on the inner bearing ring 1 and on the outer bearing ring 3 in order to support therebetween rolling members 4 which are arranged in such a manner that a double-row angular contact bearing (a so-called radiax bearing) is produced.

On the side thereof away from the universal joint 5, the inner bearing ring 1 is formed with a centering seat 6 for receiving a brake disc. The joint 5 includes an outer joint member 7 including an inner wall having formed therein grooves 8 and an inner joint member 9 arranged within the outer joint member 7 and also being provided with grooves 10, with torque transmitting balls 11 guided in the windows of a cage 12 being received, respectively, in the grooves 8 and 10 of the inner and outer joint members of the universal joint 5. The inner joint member 9 is formed with a bore within which there is received a profiled shaft 13, with the shaft 13 being in rotative engagement with the inner joint member 9 by means of splined gear teeth. A bellows 14 seals the universal joint from contaminants.

The outer joint member 7 is formed with an end face 15 which is provided with gear teeth 16 which are arranged to engage into corresponding gear teeth formed at the right hand end of the inner bearing ring 1 of the wheel bearing assembly. The gear teeth 16 serve to transmit torque from the universal joint 5 to the inner bearing ring 1 and, consequently, to the wheel hub 2 of the wheel of the vehicle. At the center of the end face 15 of the outer joint member 7, there is provided a nose 17 having a threaded inner bore 18. A center bolt 19 which is accessible through a central bore 20 of the wheel hub 2 is threadedly engaged within the center bore 18.

The central bore 20 of the wheel hub 2 is accessible through the central bore of the vehicle wheel (not shown), so that the drive shaft and universal joint 5 may be removed or fitted from the exterior of the vehicle. However, the inner bearing ring 1 may be also be designed as a nose so that separate individual bearing rings can be used.

Figure 6:
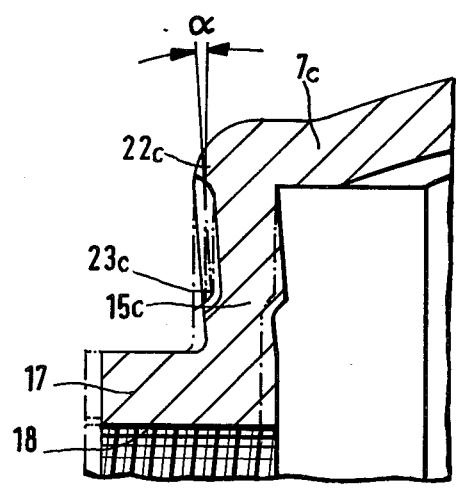
FIG. 6 is a sectional view through an outer joint member shown.

In FIG. 2 there is shown a end view of the end face 15 of the outer joint member 7. As will be apparent from FIG. 2, the end face 15 of the outer joint member 7 has formed therein the gear teeth 16 as well as the inner bore 18 which receives in threaded engagement the bolt 19. It will be seen that on the outer side thereof, the outer joint member 7 is formed with curvatures 21 which enable it to accommodate on the interior thereof the grooves 8. Referring to FIG. 6, it will be seen that the overall configuration of the end face 15 is curved or dished in such a manner that during assembly, the radially outermost regions or outer circumference 22 of the gear teeth 16 will initially engage the teeth on the hub member. The innermost region or inner circumference 23 of the end 15 will become subsequently engaged establishing contact after bolt 19 has been tightened. This type of tensioning permits large tolerances to be accommodated during production. Tightening of the bolt 19 deflects the end face 15 to the position indicated in broken lines in FIG. 6 and before such deflection, the teeth are inclined at an angle α to the plane perpendicular to the rotational axis of the assembly.

As will be seen from FIG. 2 and FIG. 2a, the gear teeth 16 are arranged radially.

A further embodiment of the present invention is depicted in FIGS. 3 and 3a wherein there is shown an outer joint member 7a which has been formed with gear teeth 16a of a type different than that previously described. The teeth 16a are very advantageous when used in an outer joint member which is made of plate metal. The shape and configuration of the teeth 16a will be evident from the illustration of FIGS. 3 and 3a.

Figure 5:
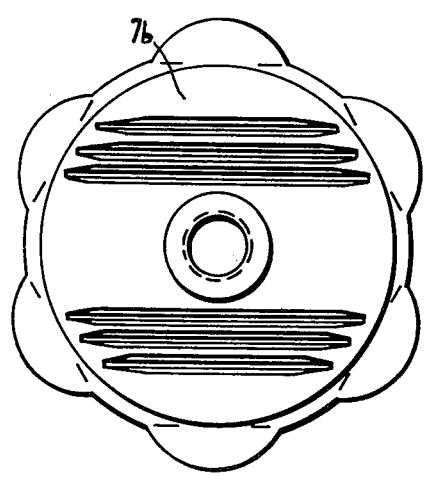
FIG. 5 is an end view of the outer joint member depicted in FIG. 4.
Figure 4:
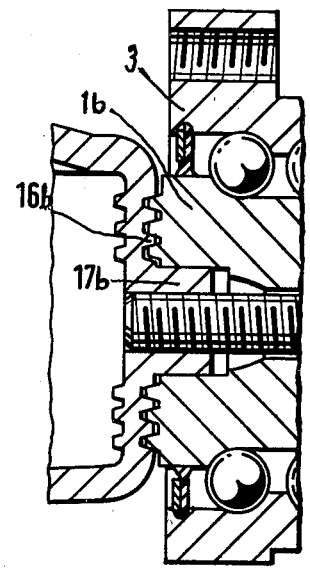
FIG. 4 is a sectional view of a further embodiment of the invention taken between the outer joint member and the inner bearing ring of the assembly.

A further embodiment of the present invention is shown in FIGS. 4 and 5 wherein an outer joint member 17b is provided with gear teeth 16b which extend parallel relative to each other. A set of teeth, such as that depicted in FIGS. 4 and 5, is advantageous from the point of view of the production of the assembly. The outer joint member 7b is formed with a nose 17b which has been provided for centering purposes and which is threadedly engaged into an inner bearing ring 1b of the wheel bearing assembly extending from the wheel hub end.

Taken in the axial direction, the journal or nose 17b must have sufficient play since the teeth 16b themselves must be tightened so as to be clearance-free.

As shown in FIG. 6, an outer joint member 7c has been provided with a curved end face 15c wherein the outer part 22c the face 15c extends at an angle α relative to a vertical line, so that the inner circumference 23c of the tension face will not rest against the inner bearing ring under pre-tension until after the tightening of the bolt 19. Furthermore, in FIG. 6 there is shown a centering journal 17 having a threaded inner bore 18.

While specific embodiments of the invention have been shown and described in detail to illustrate the application of the inventive principles, it will be understood that the invention may be embodied otherwise without departing from such principles.

We claim:

1. An assembly for the hub of a wheel of a motor vehicle comprising:
    wheel bearing means having an inner and an outer wheel bearing ring, said inner bearing ring being in driving connection with said wheel hub;
    universal joint means for driving said wheel hub through said inner bearing ring, said universal joint means including an inner joint member and an outer joint member with said outer joint member being in driving connection with said inner bearing ring;
    said wheel bearing means and said universal joint means being constructed as separate, self-contained structural units which can be connected together and separated from each other without requiring disassembly of each of said units;
    centrally located bolt means extending in connecting engagment between said wheel hub and said outer joint member in threaded engagement therebetween and adapted to be threadedly tightened to bring said wheel bearing means and said universal joint means together in assembled relationship during assembly thereof;
    an end face on said outer joint member arranged to axially face said inner bearing ring; and
    gear teeth means including gear teeth on said end face interposed between said outer joint member and said inner bearing ring for connecting them in torque transmitting engagement with each other;
    said gear teeth means consisting essentially of interengaging gear teeth having a flank angle of less than 20° which engage with each other without play in the circumferential direction and in the axial direction;
    the flank angle of said gear teeth being selected in such a manner that the teeth are self-locking and that the load resulting from torque transmitted by said joint does not cause axial forces to act upon the bearing means.

2. An assembly according to claim 1, wherein said end face on said outer joint member is formed with a dished configuration so that during assembly of said wheel bearing means with said universal joint means by tightening engagement of said bolt means, the gear teeth on said end face are initially brought into engagement at radially outer parts thereof and subsequently brought into load bearing engagement gradually from radially outwardly to radially inwardly thereof by elastic deformation of said end face occurring due to tightening engagement of said bolt means.

3. An assembly according to claim 1, wherein said outer joint member comprises at said end face a projection extending therefrom with a threaded inner central bore into which there is received said centrally located bolt means, with said centrally located bolt means extending through a center bore of said inner bearing ring.

4. An assembly according to claim 3, wherein said inner wheel bearing ring is formed to receive therein said projection on said end face of said outer joint member, said projection engaging within said inner bearing ring in a manner to perform a centering effect of sadi universal joint means reative to said assembly, said gear teeth means comprising interengaging gear teeth which extend parallel to each other.

* * * * *